Figure 1:
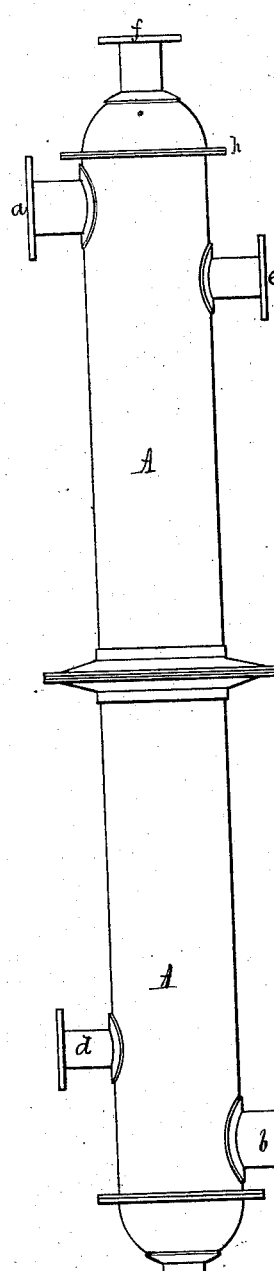

C. H. NORTH.
Coolers and Condensers, or Heaters.

No. 164,757.  Patented June 22, 1875.

UNITED STATES PATENT OFFICE.

CHARLES H. NORTH, OF SOMERVILLE, MASSACHUSETTS.

IMPROVEMENT IN COOLERS AND CONDENSERS OR HEATERS.

Specification forming part of Letters Patent No. 164,757, dated June 22, 1875; application filed May 13, 1875.

*To all whom it may concern:*

Be it known that I, CHARLES H. NORTH, of Somerville, county of Middlesex and State of Massachusetts, have invented an Improved Cooling and Condensing Apparatus, of which the following is a specification:

In the drawings, A is a vessel provided with an inlet, $a$, and an outlet, $b$, for the fluid or gas to be cooled or condensed; and also provided with a pair of inlets, $c$ $d$, and of outlets $e$ and $f$, for the cold water, cold air, or other medium for abstracting the heat from the fluid or gas to be cooled or condensed. As practically used by me, I connect the inlets $c$ and $d$ with a reservoir of cold water. The water which enters the vessel A through the inlet $c$ passes through the small pipes and out of the vessel A through the outlet $f$. These small pipes are supported at their ends by the plates $g$ and $h$, which extend across the vessel A near its end. The water which enters through the inlet $d$ fills that part of the vessel A which lies between the plates which extend across the vessel at the lines marked $i$ and $k$, and passes out of the vessel A through the outlet $e$. These plates $i$ and $k$ support the ends of the larger pipes, and the smaller pipes, supported by the plates $g$ and $h$, pass respectively through those layer pipes. An annular space is thus formed between the outside of each smaller pipe and the inside of each layer pipe, and each of these annular spaces opens into that part of the vessel A which lies between the plates $h$ and $k$, and also opens into that part of the vessel A which lies between the plates $g$ and $i$; consequently the inlet $a$, through which the fluid or gas to be cooled enters the vessel A, communicates with this space between the plates $h$ and $k$, and the outlet $b$, through which the fluid or gas to be cooled escapes from the vessel A, communicates with the space between the plates $i$ and $g$.

By this arrangement the cooling fluid is inside of the smaller pipes and outside of the larger pipes, and consequently a very large cool surface is in contact with the fluid to be cooled, while at the same time the apparatus is extremely compact.

Figure 3:
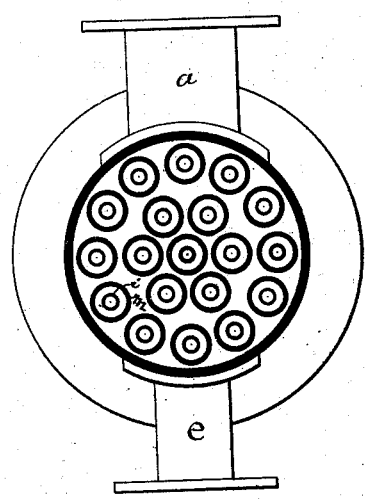
Figure 2:
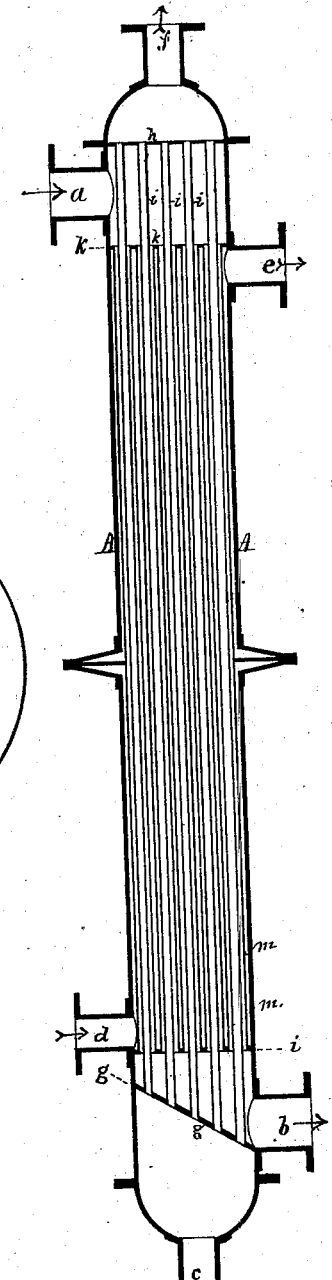

To provide for the expansion of the vessel A, I make it in two main parts, and join these two parts together by an expansion-flange, as shown in Figs. 1 and 2. Fig. 3 is a cross section on a large scale.

It will be clear that the apparatus can be used as a heater, if the steam or other heating medium be let into the vessel through the inlets $c$ and $d$; the fluid or gas to be heated passing through the inlet $a$, as before.

What I claim as my invention is—

The apparatus above described, consisting of the inlet $a$ and outlet $b$ for the fluid or gas to be cooled, the plates $g$ $h$ $i$ $k$, the two sets of pipes, the pair of inlets $c$ and $d$, and the pair of outlets $e$ and $f$ for the cooling medium, arranged together substantially as described.

CHARLES H. NORTH.

Witnesses:
 J. E. MAYNADIER,
 J. E. KNOX.